United States Patent [19]

Probst et al.

[11] Patent Number: 4,957,457
[45] Date of Patent: Sep. 18, 1990

[54] CONTROL SYSTEM FOR THE HYDRAULIC TILT FUNCTION OF A MARINE ENGINE

[75] Inventors: Harry C. Probst, Oshkosh; James L. Bloemers, Fond du Lac, both of Wis.

[73] Assignee: Brunswick Corporation, Skokie, Ill.

[21] Appl. No.: 219,053

[22] Filed: Jul. 14, 1988

[51] Int. Cl.$^5$ .............................................. B63H 5/12
[52] U.S. Cl. ....................................... 440/61; 137/503
[58] Field of Search ..................... 440/53, 55, 56, 61, 440/65; 114/150; 137/503

[56] References Cited

U.S. PATENT DOCUMENTS

| | | | |
|---|---|---|---|
| 2,703,631 | 3/1955 | Hupp | 137/503 |
| 3,138,174 | 6/1964 | Gilpin | 137/503 |
| 3,983,835 | 10/1976 | Hall | 440/61 |
| 4,702,714 | 10/1987 | Nakase | 440/61 |

Primary Examiner—Joseph F. Peters, Jr.
Assistant Examiner—Jesus D. Sotelo
Attorney, Agent, or Firm—Andrus, Sceales, Starke & Sawall

[57] ABSTRACT

A system for controlling the movement of hydraulic fluid through the fluid containing chambers of a hydraulic cylinder operatively connected between a marine vessel and its outboard drive unit includes valves disposed within the cylinder to restrict the flow of fluid between the fluid chambers and a bypass for allowing unrestricted flow of fluid between the fluid chambers. The system includes a trim valve to allow limited flow of fluid in a first direction of piston movement and a tilt valve to allow unrestricted flow of fluid between the fluid chamber of the cylinder. A velocity sensing valve is provided to sense and prevent rapid upward movement of the drive unit.

4 Claims, 4 Drawing Sheets

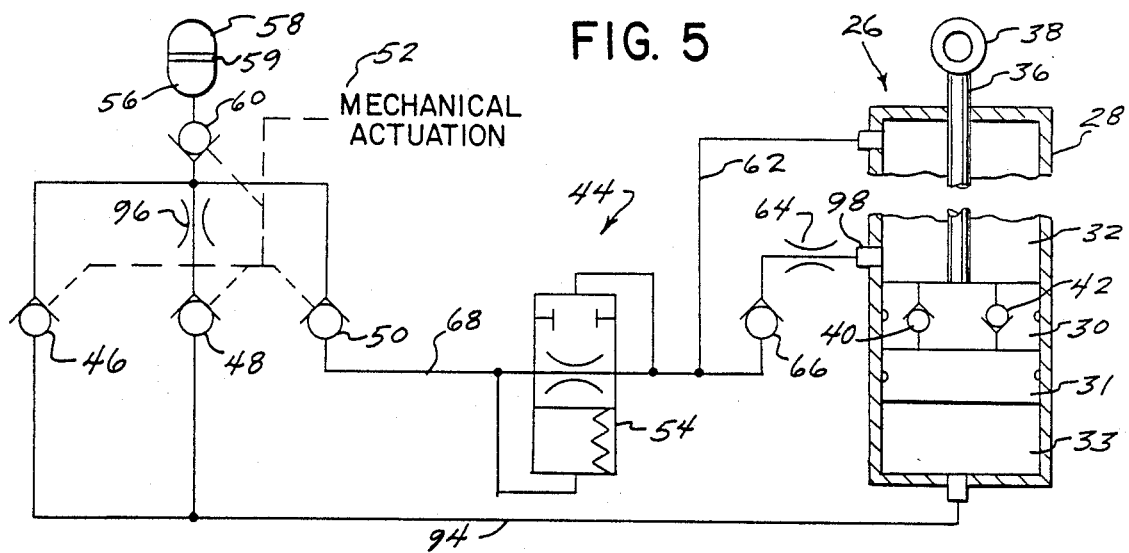
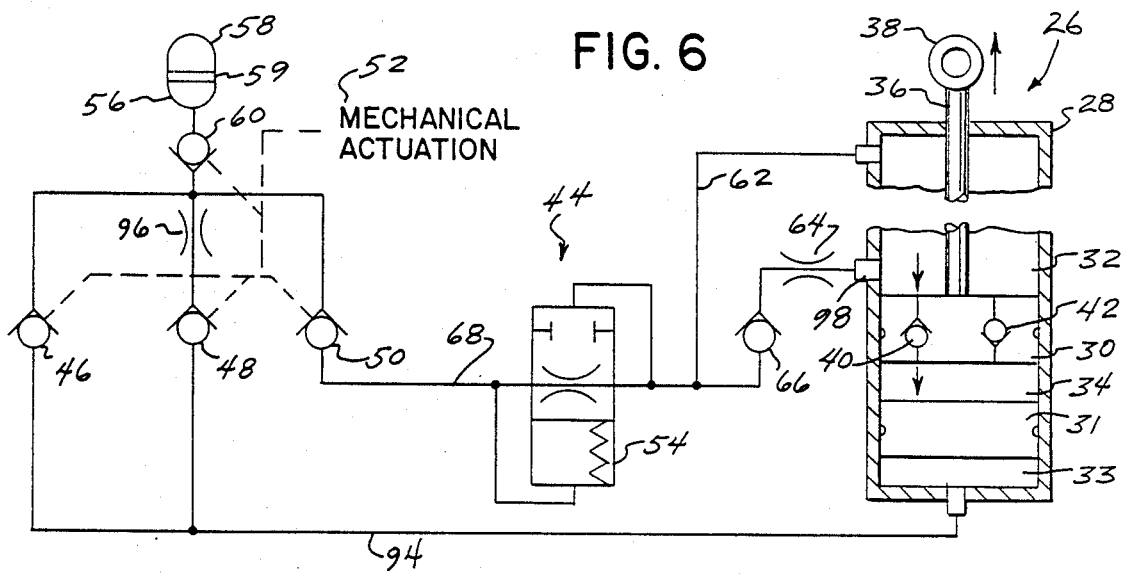
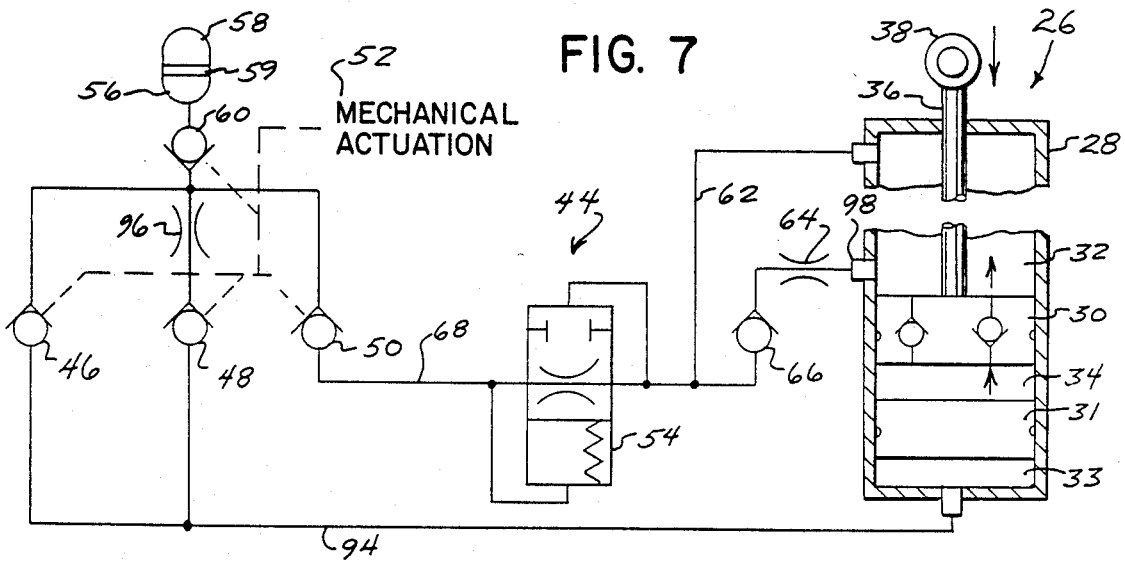

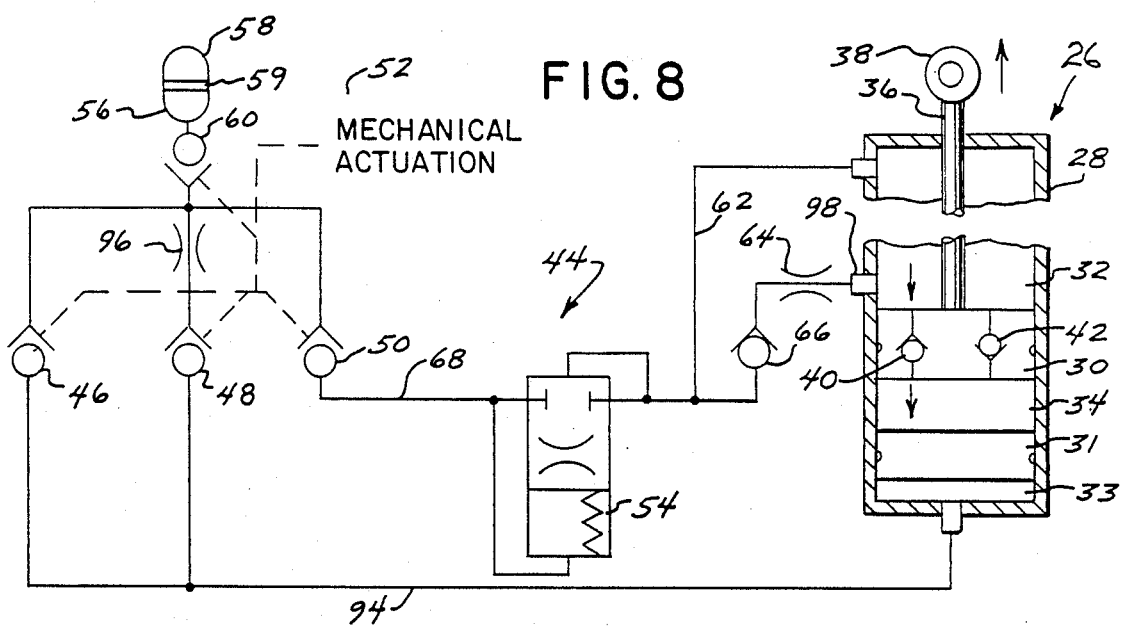
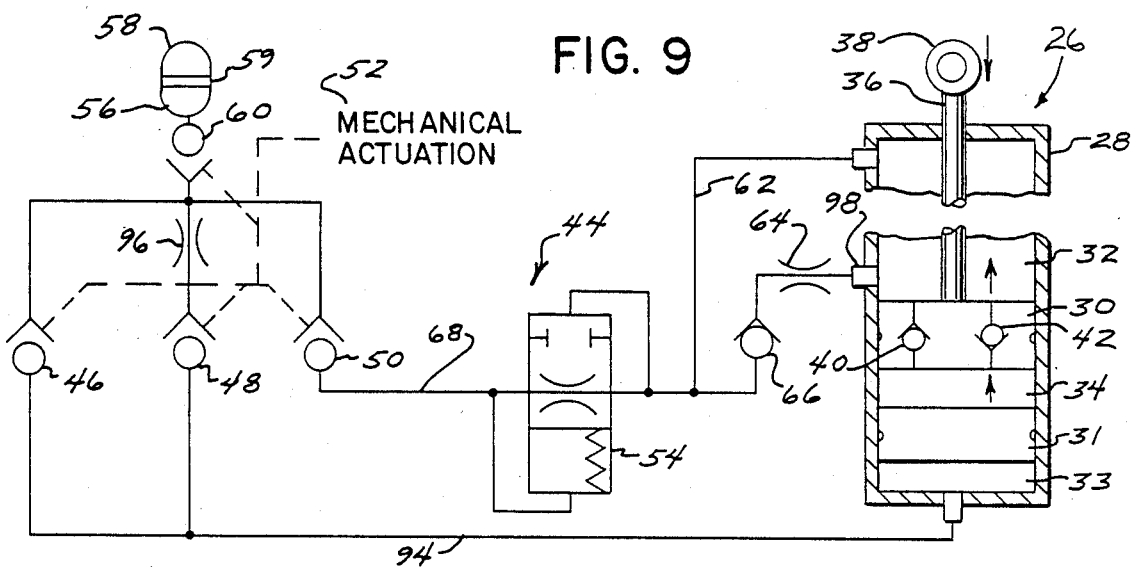
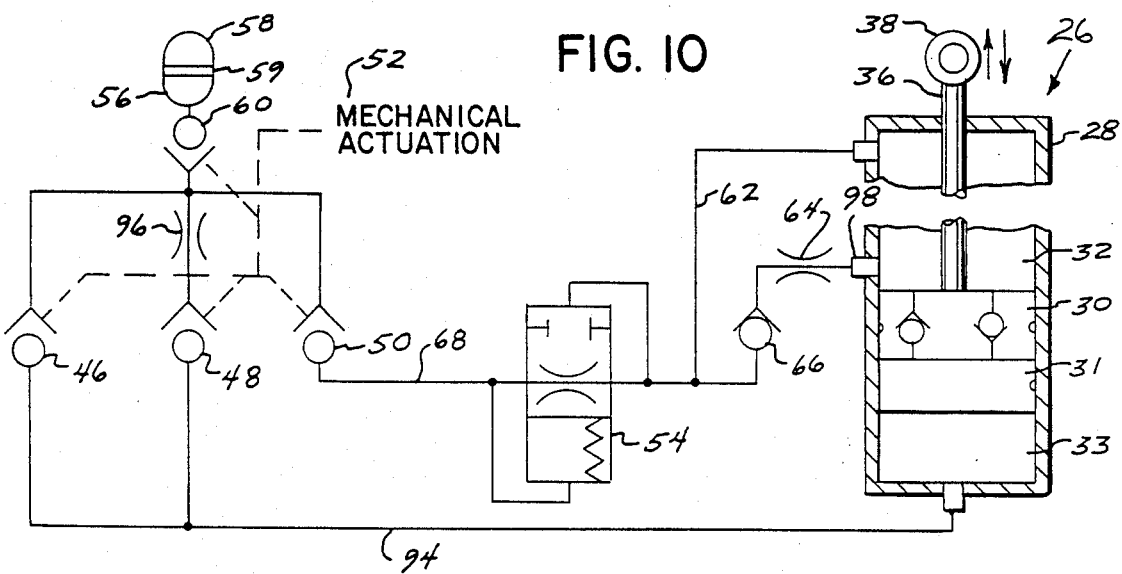

CONTROL SYSTEM FOR THE HYDRAULIC TILT FUNCTION OF A MARINE ENGINE

BACKGROUND OF THE INVENTION

The present invention relates to a control system for the operation of a hydraulic tilt system for a marine outboard engine and more particularly to a control system that allows for the slow trim or fast tilt of the marine drive unit and also senses and prevents the uncontrolled rapid upward movement of the drive unit.

A typical outboard drive unit is attached to the stern of a marine vessel by means of a vertically pivotable support bracket that allows the drive unit to be selectively tilted downwardly into, or upwardly out of, the water. In order to perform satisfactorily, the drive unit should preferably be capable of being locked in its down position so that the drive unit does not swing upwardly due to the thrust of the propeller when the vessel is driven in the reverse direction. The locking system should preferably also prevent the drive unit from being swung upwardly by the resistance of the water when the vessel suddenly decelerates or stops. In order to prevent or at least minimize damage to the drive unit, however, the locking system preferably should automatically release and allow the drive unit to swing upwardly in the event of a collision with a submerged obstacle. The locking system preferably should also be selectively releasable by the operator so that the drive unit may be tilted out of the water for landing or storage. The locking system should also allow for the trimming of the drive unit while underway and for placing the drive unit in a shallow water drive tilt position as well as being adjustable in both forward and reverse modes.

In the past, these functions have been performed by means of complex interconnected mechanical linkages and springs such as shown in U.S. Pat. Nos. 4,064,824; 4,052,952; 3,999,502; 3,983,835; 3,888,203; 3,863,592; 3,839,986; Re.27,932; 3,722,455; 3,434,450; 3,434,448; and 3,285,221. Some of these systems have substituted hydraulic or gas pressurized hydraulic apparatus for such linkages but have been unable to adequately perform the required functions.

Systems such as that shown in U.S. Pat. No. 4,493,659 have been utilized to overcome some of the shortcomings present in earlier systems but systems such as these do not provide all of the functions desired.

SUMMARY OF THE INVENTION

The present invention provides a control system that allows for all of the functions discussed above and permits a slow trim and fast tilt operation and also senses and prevents the unwanted rapid movement of the drive unit.

A system for controlling the movement of hydraulic fluid through a piston containing hydraulic cylinder operatively connected between a marine vessel and a marine drive unit includes valve means in the cylinder for restricting the flow of fluid between the fluid chambers of the cylinder and a bypass means for allowing unrestricted flow of fluid between the fluid chambers.

In accordance with one aspect of the invention, the bypass is provided with a trim valve that allows for limited flow of fluid in a first direction of piston movement.

In accordance with another aspect of the invention, the bypass is provided with a tilt valve means that allows for unrestricted flow of fluid in the first direction of piston movement when the trim valve is in an open position.

In accordance with yet another aspect of the invention, the bypass is provided with a velocity sensing valve which moves from a normally opened position to a closed position in response to high velocity fluid flow indicative of rapid upward movement of the drive unit.

In accordance with still another aspect of the invention, the control system is provided with an auxiliary bypass means that assists the flow of fluid between the chambers when the piston is returning from an extremely extended position to a position indicative of a lower drive unit.

The control system is also provided with manual actuating means for selectively opening and closing the various valves located in the system.

The present invention thus provides a system that controls the movement of hydraulic fluid through the fluid containing chambers of a hydraulic cylinder and which permits the operator to selectively determine the direction and rate of flow between the chambers. The system also senses and prevents the undesired rapid upward movement of the drive unit.

BRIEF DESCRIPTION OF THE DRAWINGS

The drawings illustrate the best mode presently contemplated of carrying out the invention.

In the drawings:

FIGS. 5-11 are schematic representations of the control system illustrating various stages of its operation as follows;

FIG. 5 illustrates the control system when the outboard drive unit is in a lowered position and running at speed;

FIG. 6 illustrates the control system when the outboard drive unit is lowered and running at speed and has struck an underwater object with all valves closed;

FIG. 7 illustrates the control system when the outboard drive unit has been raised due to striking an underwater object and is in the process of returning to its lowered position;

FIG. 8 illustrates the control system when the manual valves have been opened and the outboard drive unit has struck an underwater object;

FIG. 9 illustrates the control system when the engine has moved to a raised position due to striking an underwater object and the engine is now returning to its lowered position with the valves in the opened position;

FIG. 10 illustrates the control system when the drive unit is either not running or is running at a very low speed and the valves have been opened; and FIG. 11 illustrates the control system when the drive unit is in its lowered position and running at speed and the slow trim valve has been opened.

DESCRIPTION OF THE PREFERRED EMBODIMENT

Figure 1:
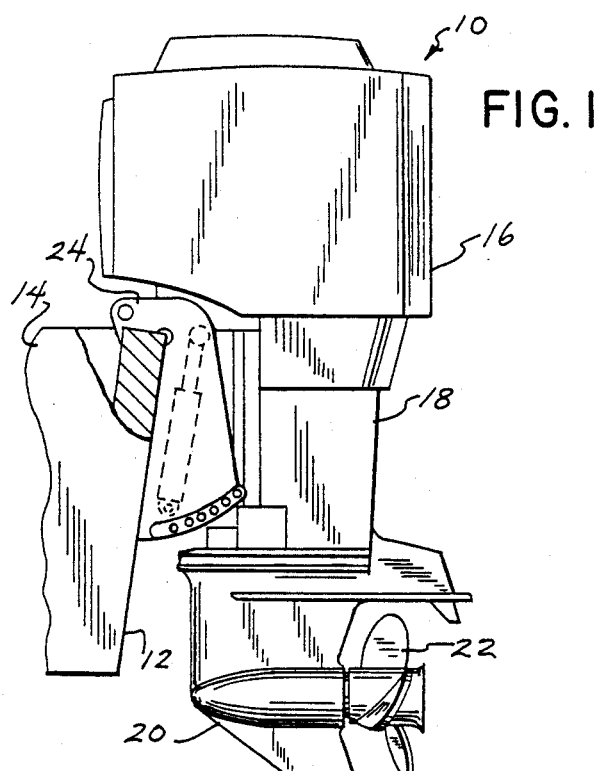
FIG. 1 is a left side elevational view of an outboard drive unit utilizing a hydraulic cylinder tilt system.

FIG. 1 illustrates a typical outboard drive unit 10 pivotally attached to a transom 12 of a marine vessel 14. Drive unit 10 includes a power head 16, a drive shaft housing 18 and a lower unit 20 including a propeller 22. Drive unit 10 is pivotally attached, for vertical and steering movement, to transom 12 by a support bracket 24 and a hydraulic cylinder 26 is operatively connected between outboard drive unit 10 and support bracket 24 to assist in the manual tilt/trim of drive unit 10.

As shown in FIGS. 5–11, hydraulic cylinder 26 includes a cylinder housing 28 in which piston head 30 and memory piston 31 are slidably disposed. Piston head 30 and memory piston 31 define a pair of fluid chambers 32 and 33 and piston head 30 has a piston rod 36 connected to it and extending outwardly from casing 28. End 38 of piston rod 36 is pivotally attached to drive unit 10 so that the extension of piston rod 36 results in pivotal movement of outboard drive unit 10 in such a manner that lower unit 20 is moved upwardly out of the water. Piston head 30 and memory piston 31 are normally in contact and move in unison. However, an upward force on piston rod 36 will cause piston head 30 to move upwardly while memory piston 31 remains in place. This separation creates an additional fluid chamber 34 (see FIG. 6).

Piston head 30 is provided with a pair of valves 40 and 42. Valve 40 is normally closed but upon experiencing sufficient pressure from chamber 32, valve 40 will open and allow restricted flow of hydraulic fluid from chamber 32 to chamber 34. This typically takes place when there is sufficient upward force on piston rod 36. Similarly, valve 42 is normally closed but upon experiencing sufficient pressure from chamber 34, valve 42 will open and allow restricted flow of hydraulic fluid from chamber 34 to chamber 32. This would occur when a downward force is exerted on piston rod 36. Valve 40 is typically set at a range of 900 psi while valve 42 is set at a lower pressure range of 30–100 psi. This is due to the fact that the upward forces experienced by piston rod 36 are typically much greater than the downward force which is usually limited to the weight of outboard drive unit 10.

The flow of hydraulic fluid between chambers 32 and 34 is monitored and controlled by control system 44 that includes a series of one way check valves 46, 48 and 50 whose position is controlled manually by a mechanical actuator 52. Mechanical actuator 52 is a typical lever and cam type control and will not be explained in detail here.

Control system 44 is also provided with a velocity valve 54 whose operation will be described in detail below, a pressurized fluid reservoir 56 having an accumulator 58 with a piston 59 and an associated check valve 60. The operation of check valve 60 is also controlled by mechanical actuator 52. Control system 44 comprises a bypass of valves 40 and 42 so as to allow a less restricted flow of hydraulic fluid between chambers 32 and 33 and system 44 also includes an auxiliary bypass system 62 having a restriction 64 and an associated check valve 66.

The operation and the interaction of the various components of control system 44 can best be described by referring to FIGS. 5–11 which show the system operating under various operating conditions for drive unit 10.

FIG. 5 is illustrative of a situation in which drive unit 10 is in its lowered position such as that shown in FIG. 1 and running at speed. Mechanical actuator 52 is in its closed position in which valves 46, 48, 50 and 60 are in their closed position and drive unit 10 is not experiencing any unusual forces that would cause movement of piston head 30, so that memory piston 31 is in contact with piston head 30.

FIG. 6 is illustrative of a situation similar to that shown in FIG. 5 where drive unit 10 is in its lowered position and is running at speed and valves 46, 48 and 50 are still in their closed position. However, in FIG. 6, drive unit 10 has struck an underwater object and thus an upward force is exerted on piston rod 36. The upward force causes pressurization of the hydraulic fluid contained in chamber 32 and this force is communicated to hydraulic line 68. However, since valve 50 is in a closed position the pressure cannot be relieved and the pressure will act on valve 40 causing it to move to an open position. With valve 40 in its open position, a restricted flow of hydraulic fluid is allowed from chamber 32 to chamber 34 as cylinder head 30 moves upwardly away from memory piston 31. This restricted flow acts as a shock absorber function restraining drive unit 10 from rising too fast or too high.

FIG. 7 is illustrative of the situation immediately subsequent to that of FIG. 6 in which the drive unit has passed over the submerged obstacle and is returning to its lowered position. The sheer weight of drive unit 10 causes sufficient downward force to pressurize the hydraulic fluid in chamber 34 to the point where valve 42 is moved to its open position and a restricted flow of hydraulic fluid is allowed from chamber 34 to chamber 32. Drive unit 10 will thus slowly lower itself back to its original position where piston head 30 is in contact with memory piston 31.

FIG. 8 is illustrative of a situation in which drive unit 10 is in its lowered position and mechanical actuator 52 has been moved to its full open position in which valves 46, 48, 50 and 60 are in their open position. In FIG. 8, drive unit 10 has struck an underwater object and an upward force is being exerted on piston rod 36 and the hydraulic fluid in chamber 32 has been pressurized. Since valve 50 is in its open position, hydraulic fluid will initially flow through hydraulic line 68 at a high speed. However, upon detecting this high velocity flow, velocity valve 54 will move to its closed position. With flow prevented in hydraulic line 68, the pressure in chamber 32 acts on valve 40 to move it to its open position and once again, a restricted flow of hydraulic fluid is allowed from chamber 32 to chamber 34. Thus, even if valve 50 is in its open position, velocity valve 54 will prevent the rapid upward movement of outboard drive unit 10.

Figure 4:
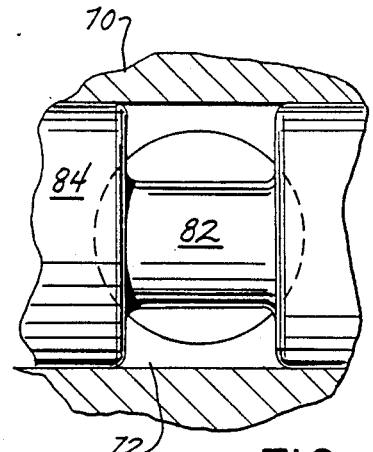
FIG. 4 is a cross sectional view taken along the line 4—4 of FIG. 2.
Figure 2:
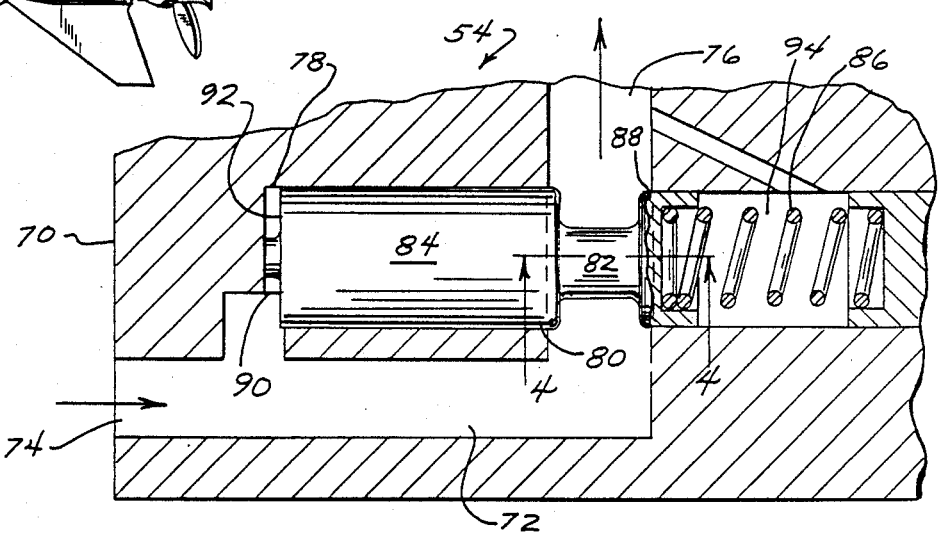
FIG. 2 is a side cross sectional view of the velocity valve utilized in the control system of the invention.
Figure 3:
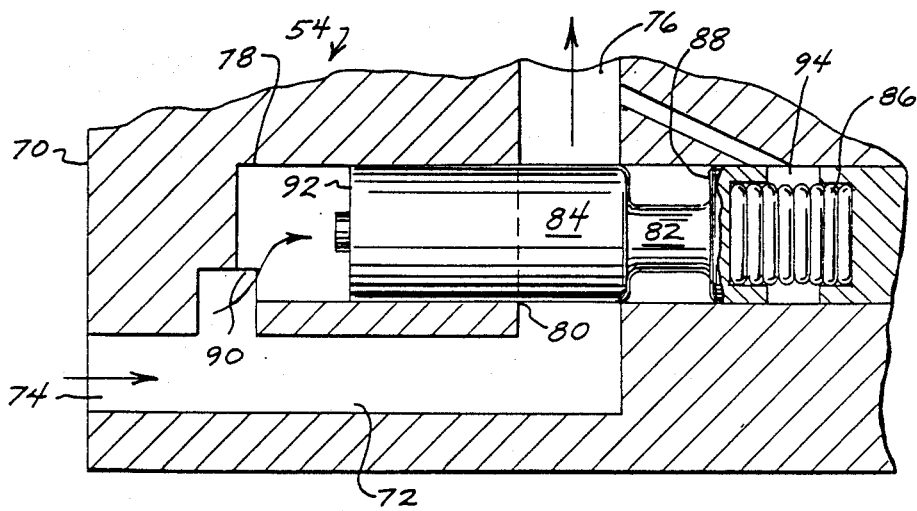
FIG. 3 is a view similar to that of FIG. 2 with the spool of the velocity valve moved to a closed position.

The structure and operation of velocity valve 54 is illustrated in FIGS. 2–4. As seen in FIG. 2, velocity valve 54 includes a valve body 70 defining a fluid flow passageway 72 having an inlet 74 and an outlet 76. Valve body 70 further includes a bore 78 in which a spool 80 is slidably disposed. Spool 80 includes a reduced diameter portion 82 that restricts the flow of fluid through passageway 72. An enlarged diameter portion 84 which when positioned across passageway 72 (as shown in FIG. 3) prevents the flow of hydraulic fluid in passageway 72. Spool 80 is biased to its open position in which reduced portion 82 is disposed in passageway 72 by means of a spring 86 which acts on a spring seat 88 of spool 80. Valve 54 is provided with a communication passageway 90 which allows the pressurized fluid in passageway 70 to act on spool surface 92. Due to the restriction caused by reduced portion 82 a pressure differential is created in passageway 72. At flow rates of approximately 5 cubic inches per second the pressure differential becomes great enough that the pressure exerted on surface 92 is great enough to overcome the force of spring 86 and the pressure of any hydraulic fluid in spring chamber 94. Thus, spool 80 will be moved to the right and enlarged spool portion 84 will move into passageway 72 and further restrict the flow of hydraulic fluid. This causes an even greater pressure differential and an even greater force on surface 92 so that spool 80 is moved to its fully closed position as shown in FIG. 3. Thus, when valve 54 senses a flow rate greater than 5 cubic inches per second, it moves to a closed position and the pressurized fluid acts to open valve 40. Flow rates sufficient to close valve 54 can be experienced at boat speeds of approximately 6 miles per hour or greater. Thus, if valves 46, 48 and 50 are in their open position and drive unit 10 strikes a submerged object at a boat speed of 6 miles per hour or greater, velocity valve 54 will move to its closed position to prevent the flow of hydraulic fluid through valve 50. Thus, the rapid upward movement of drive unit 10 is prevented even though bypass system 44 has been placed in an open condition and the restricted flow of hydraulic fluid from chamber 32 to chamber 34 will be accomplished through valve 40 resulting in a much slower upward movement of drive unit 10.

FIG. 9 is illustrative of a situation immediately following that of FIG. 8 in which drive unit 10 has reached its limit of upward movement and is now returning to its lowered position Accumulator 58 is supplying pressurized fluid through line 94 which prevents memory piston 31 from moving to a lower position. The pressure in chamber 34 caused by the weight at drive unit 10 moves valve 42 to its open position and a restricted flow of pressurized fluid is allowed from chamber 34 to chamber 32 so that drive unit 10 slowly moves to its lowered position.

In FIG. 10, drive unit 10 is either not running or running at a very low thrust level and the operator has moved mechanical actuator 52 to a position where valves 46, 48, 50 and 60 are in their open position. Accumulator 58 is supplying pressurized fluid at 300 to 700 psi to the system which offsets the natural weight of drive unit 10 by approximately 80%. With pressurized fluid supplied to the system and all of the valves in their open position so as to allow the relatively unrestricted flow of fluid between chambers 32 and 33, drive unit 10 may easily be tilted to its upper position. Thus, FIG. 10 is illustrative of a situation in which the boat operator desires to manually raise drive unit 10 to any desired tilt position.

Figure 11:
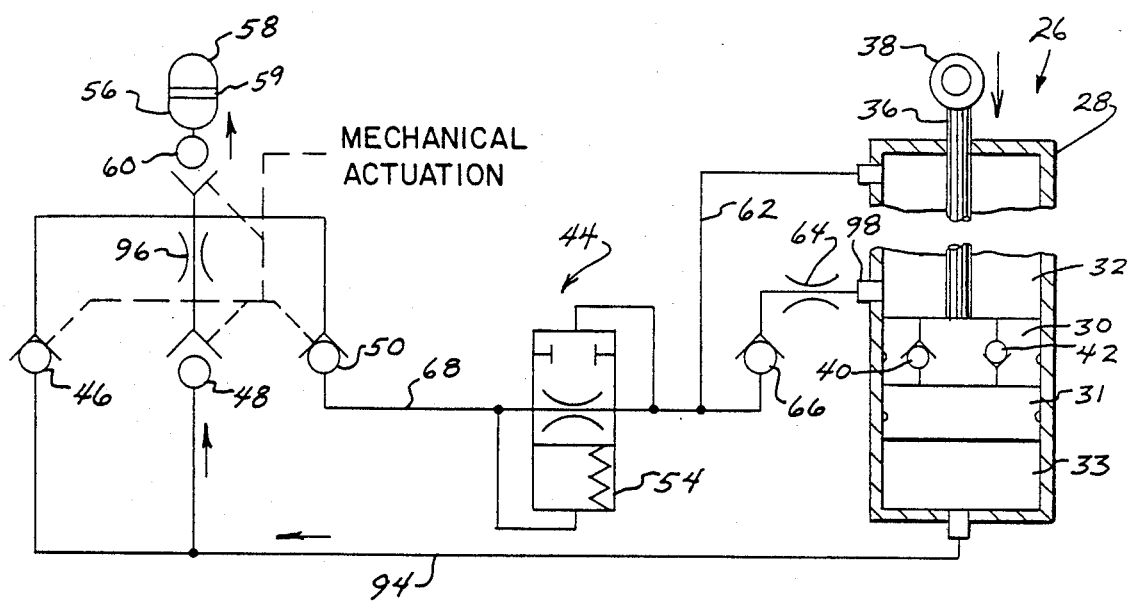

FIG. 11 is illustrative of a situation in which the drive unit 10 is running at speed and the boat operator wishes to bring drive unit 10 to a lower position in order to trim the boat. In FIG. 11, the boat operator has moved mechanical actuator 52 to an intermediate position in which only slow trim valve 48 and accumulator valve 60 are in the open position. In this position, hydraulic fluid is allowed to flow through line 94 and back into accumulator 58. Restriction 96 prevents the rapid flow of hydraulic fluid so that drive unit 10 slowly moves to the desired trim position. Thus, valve 48 serves as a trim valve when in an open position while valves 46 and 50 operate as a tilt valve system for the rapid tilting of drive unit 10 when valves 46 and 50 are in their open position.

Control system 44 is also provided with an auxiliary bypass 62 which can operate when piston head 30 is in a fully raised position so that the bottom of piston head 30 is above port 98 in cylinder housing 28. In this position, pressurized fluid below piston head 30 will act on valve 66 causing it to move to its open position so that pressurized fluid from chamber 34 is allowed to flow to chamber 32 through bypass line 62. Once piston head 30 has closed or passed port 98, auxiliary bypass 62 becomes inoperative and the flow of fluid from chamber 34 to chamber 32 must be accomplished through valve 42.

It is recognized that various alternatives and modifications are possible in the scope of the appended claims.

We claim:

1. In a marine vessel having an outboard drive unit pivotally mounted thereto and a piston containing hydraulic cylinder operatively connected between the vessel and the drive unit so that pivotal movement of the drive unit results in the displacement of hydraulic fluid between a pair of fluid chambers in the cylinder, a system for controlling the movement of hydraulic fluid through the cylinder, said system comprising:
    valve means in the cylinder restricting the flow of fluid between the fluid chambers,
    bypass means allowing a less restricted flow of fluid between the fluid chambers,
    a trim valve disposed in said bypass means allowing limited flow of fluid in a first direction of piston movement when said trim valve is in an open position,
    tilt valve means disposed in said bypass means allowing unrestricted flow of fluid between the fluid chambers of the cylinder when said tilt valve means is in an open position,
    velocity sensing valve means disposed in said bypass means for sensing high velocity fluid flow caused by rapid piston movement in a second direction and moving from a normally open position to a closed position in response to said high velocity fluid flow, and
    actuating means for selectively opening and closing said trim valve and said tilt valve means.

2. The control system defined in claim 1 wherein said actuating means comprises a manual control that opens said trim valve prior to opening said tilt valve means.

3. The control system defined in claim 1 wherein said velocity sensing valve means comprises,
    a valve body defining fluid flow passageway having an inlet and an outlet and a spool containing bore intersecting said passageway,
    spool disposed within said bore and movable between an open position wherein a reduced diameter portion restricts fluid flow through said passageway and a closed position wherein an enlarged diameter portion prevents fluid flow through said passageway,
    biasing means urging said spool to said open position, and
    a communication passageway for transmitting fluid pressure upstream of said bore to a surface of said spool so that said pressure urges said spool to a closed position.

4. In a marine vessel having an outboard drive unit pivotally mounted thereto and a piston containing hydraulic cylinder operatively connected between the vessel and the drive unit so that pivotal movement of the drive unit results in the displacement of hydraulic fluid between a pair of fluid chambers in the cylinder, a system for controlling the movement of hydraulic fluid through the cylinder, said system comprising:

valve means in the cylinder restricting the flow of fluid between the fluid chambers, bypass means allowing a less restricted flow of fluid between the fluid chambers, a trim valve disposed in said bypass means allowing limited flow of fluid in a first direction of piston movement when said trim valve is in an open position, tilt valve means disposed in said bypass means allowing unrestricted flow of fluid between the fluid chambers of the cylinder when said tilt valve means is in an open position, velocity sensing valve means disposed in said bypass means for sensing high velocity fluid flow caused by rapid piston movement in a second direction and moving from a normally open position to a closed position in response to said high velocity fluid flow.

auxiliary bypass means for assisting the flow of fluid between fluid chambers during piston movement in said first direction when said piston is returning from an extended position within the cylinder, and actuating means for selectively opening and closing said trim valve and said tilt valve means.

* * * * *